(12) United States Patent
Johnson et al.

(10) Patent No.: US 8,050,829 B2
(45) Date of Patent: Nov. 1, 2011

(54) ELECTRONICALLY CONTROLLED DIFFERENTIAL LOCKER

(75) Inventors: Rory Matthew Johnson, Grand Blanc, MI (US); Christopher C. Murray, Bloomfield Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 541 days.

(21) Appl. No.: 12/353,418

(22) Filed: Jan. 14, 2009

(65) Prior Publication Data

US 2010/0179736 A1 Jul. 15, 2010

(51) Int. Cl.
 *F16H 48/20* (2006.01)
 *G06F 17/00* (2006.01)
(52) U.S. Cl. .............. 701/51; 701/69; 701/88; 475/160; 180/249
(58) Field of Classification Search ............ 701/51, 701/69, 88; 475/230, 231, 160; 180/249
See application file for complete search history.

(56) References Cited

U.S. PATENT DOCUMENTS

| 7,264,568 | B2 * | 9/2007 | Ludwig et al. | 475/233 |
| 7,320,659 | B2 * | 1/2008 | Pritchard et al. | 475/331 |
| 2005/0250613 | A1 | 11/2005 | Ludwig et al. | |
| 2008/0015076 | A1 | 1/2008 | Fusegi et al. | |

FOREIGN PATENT DOCUMENTS

| JP | 07-167255 A | 7/1995 |
| JP | 2006112829 A | 4/2006 |
| KR | 2008-0017647 A | 2/2008 |

OTHER PUBLICATIONS

Nikkei Mechanical Supplement, Mechanical Design Art Series, vol. 3; 28cm, "Fundamentals and Applications Materials Required for the Design of Manufacturing Technology"; May 27, 1991, Nikkei BP, Tokyo, Japan, pp. 156-169 and 262-269 (pp. 167 and 266 considered most relevant).
Declaration of Chris Murray, executed Jan. 7, 2010, 4 pages.
Declaration of Rory M. Johnson, executed Jan. 8, 2010, 6 pages.
Notification of Transmittal of the International Search Report and the Written Opinion of the International Searching Authority, or the Declaration in PCT/US2010/020302 dated Jul. 13, 2010. (8 pages).
English Abstract of JP 07-167255 (1 page).

* cited by examiner

*Primary Examiner* — Richard M. Camby
(74) *Attorney, Agent, or Firm* — Jennifer M. Brumbaugh; Mick A. Nylander; Rader, Fishman & Grauer PLLC

(57) ABSTRACT

An electronic locking mechanism for a vehicle differential assembly includes a lock element movable in response to an actuation signal between an open position and a locked position. The lock element generally forces side gears of the differential assembly to turn generally at a same rate when the lock element is in the locked position. The electronic locking mechanism further includes a processor configured to determine a status of the differential assembly from a current profile that includes the actuation signal and an induced current. The determined differential assembly status is generally one of an "activated and locked" status, an "activated but unlocked" status, a "deactivated but locked" status, and a "deactivated and unlocked" status.

21 Claims, 6 Drawing Sheets

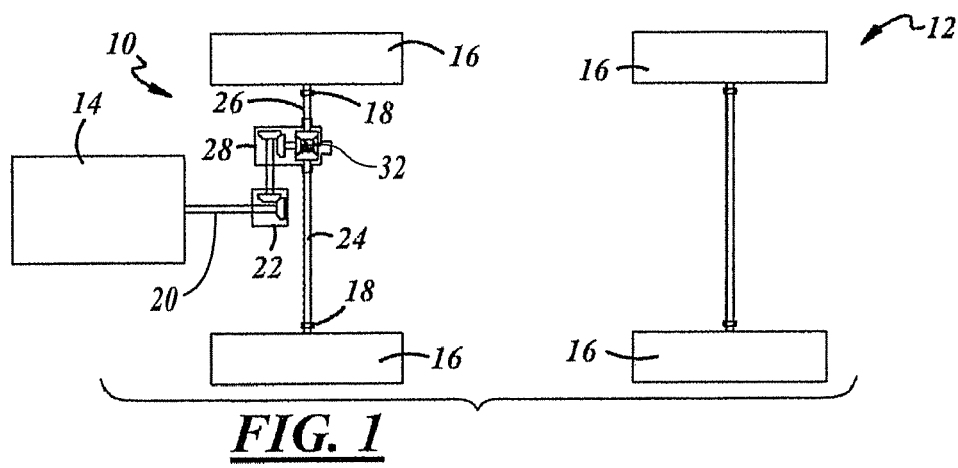
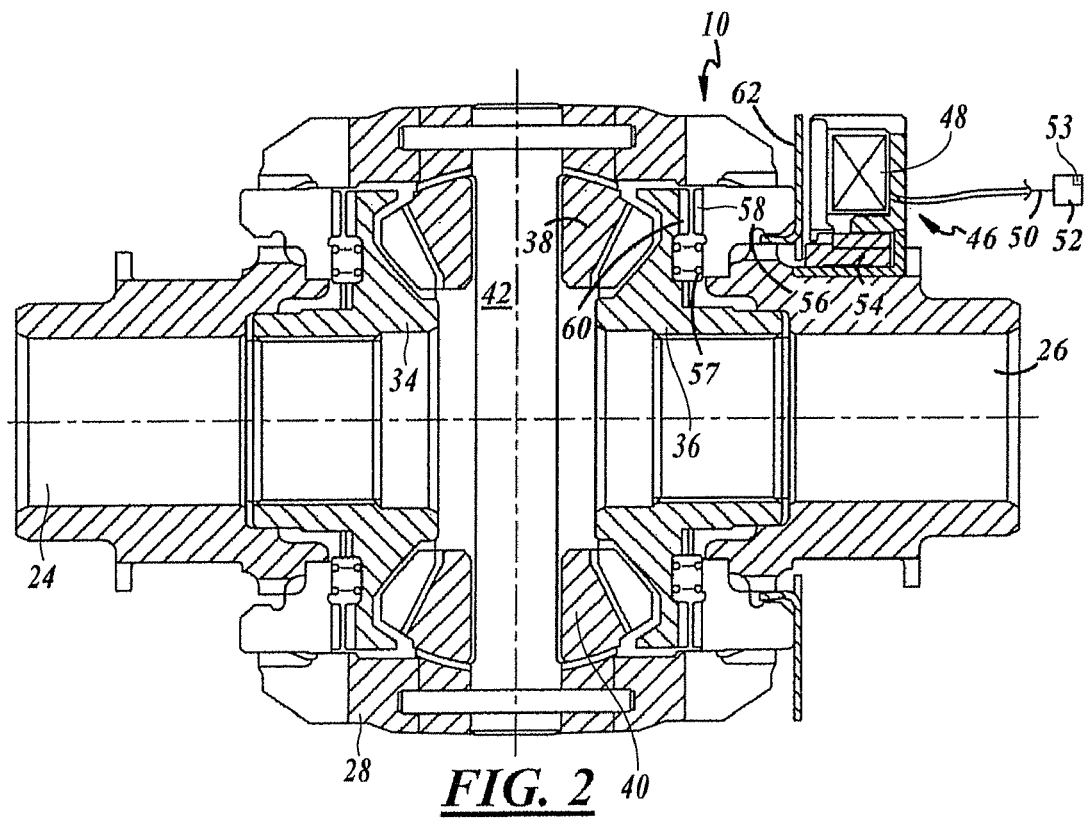

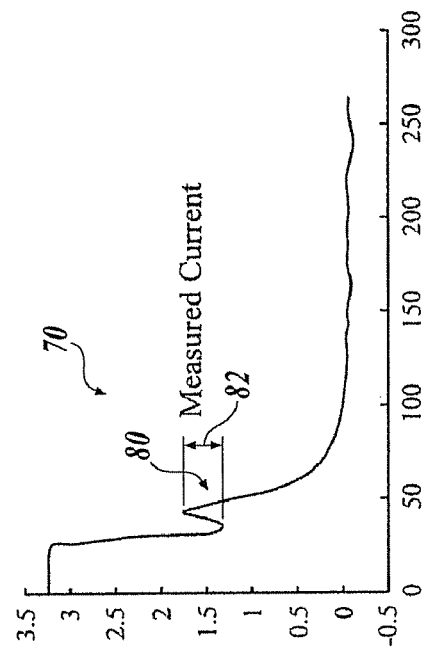
FIG. 6
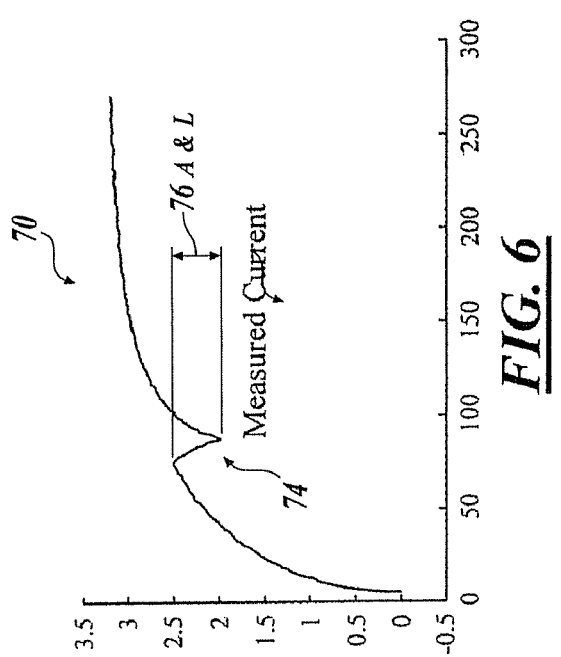
FIG. 7
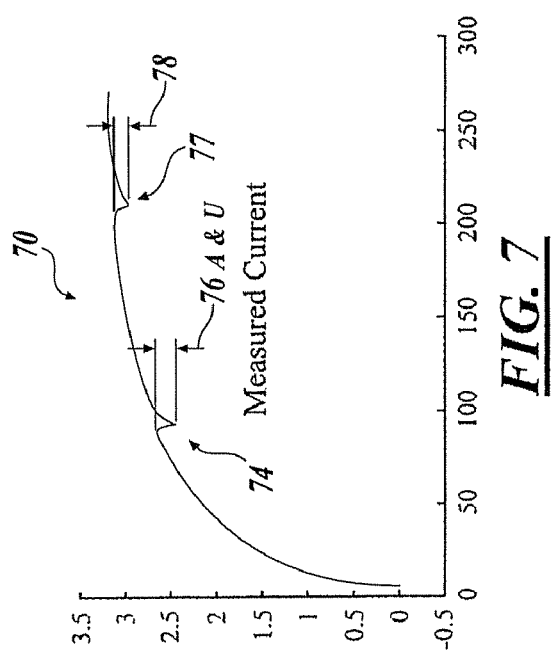
FIG. 8
FIG. 9

ELECTRONICALLY CONTROLLED DIFFERENTIAL LOCKER

BACKGROUND

During normal operation of a motor vehicle, it is common that all four wheels may not be turning at an identical rate of speed. Different wheel turn rates are most commonly encountered when the vehicle is making a turn, but may also be caused by braking or non-uniform road surface conditions. In order to accommodate differing wheel spin rates while continuing to direct power to two wheels it is possible to provide a differential that allows for different wheel turn rates between the powered wheels. The differential allows the wheels to spin at independent rates while delivering power to each wheel. While this solution may be satisfactory in some driving conditions, it is unsatisfactory under conditions where one of the powered wheels experiences a surface having a much lower coefficient of friction than a surface being experienced by the other wheel(s). Such conditions may prevent the application of torque to the wheel with the most traction, thereby resulting in unacceptable vehicle performance.

The differential may be locked to prevent different spin rates such that the wheels are forced to rotate in unison, thus ensuring that the wheels effectively apply torque to the ground surface and vehicle control is maintained. A wide variety of electrical and mechanical systems may be used to lock a differential. Unfortunately, merely activating an actuation system does not always guarantee that the differential is actually locked. For various reasons, including the fact that gear faces may be misaligned, a vehicle controller may send an activation signal to lock the differential, without resulting in the differential being successfully locked. Therefore, the vehicle may incorporate complex systems to monitor the actual status of the differential. For example, it is possible to verify the lock status of a differential by employing an independent switch. However, such a switch requires additional wiring to the control system, which is commonly positioned remotely. Other systems utilize other independent signals such as wheel speed sensors to monitor the actual status of the differential, but these systems incur additional complexity and cost to receive and analyze data generated by the wheel speed sensors.

In general, present differential monitoring and sensing systems add undesirable complexity to vehicle design and additional components that may suffer from wear and damage.

BRIEF DESCRIPTION OF THE DRAWINGS

Referring now to the drawings, exemplary illustrations are shown in detail. Although the drawings represent some examples, the drawings are not necessarily to scale and certain features may be exaggerated, removed, or partially sectioned to better illustrate and explain the present invention. Further, the exemplary illustrations set forth herein are not intended to be exhaustive or otherwise limit or restrict the claims to the precise forms and configurations shown in the drawings and disclosed in the following detailed description:

FIG. 1 is a schematic diagram of an exemplary differential design.

FIG. 2 is a cross-sectional illustration of the exemplary differential design illustrated in FIG. 1, the differential design illustrated in an open position.

FIG. 6 is an illustration of a current profile representative of an activated and immediate locked position.

FIG. 7 is an illustration of a current profile representative of an activated and delayed locked position.

FIG. 8 is an illustration of a current profile representative of a deactivated and immediate open position.

FIG. 9 is an illustration of a current profile representative of a deactivated and delayed open position.

DETAILED DESCRIPTION

Figure 3:
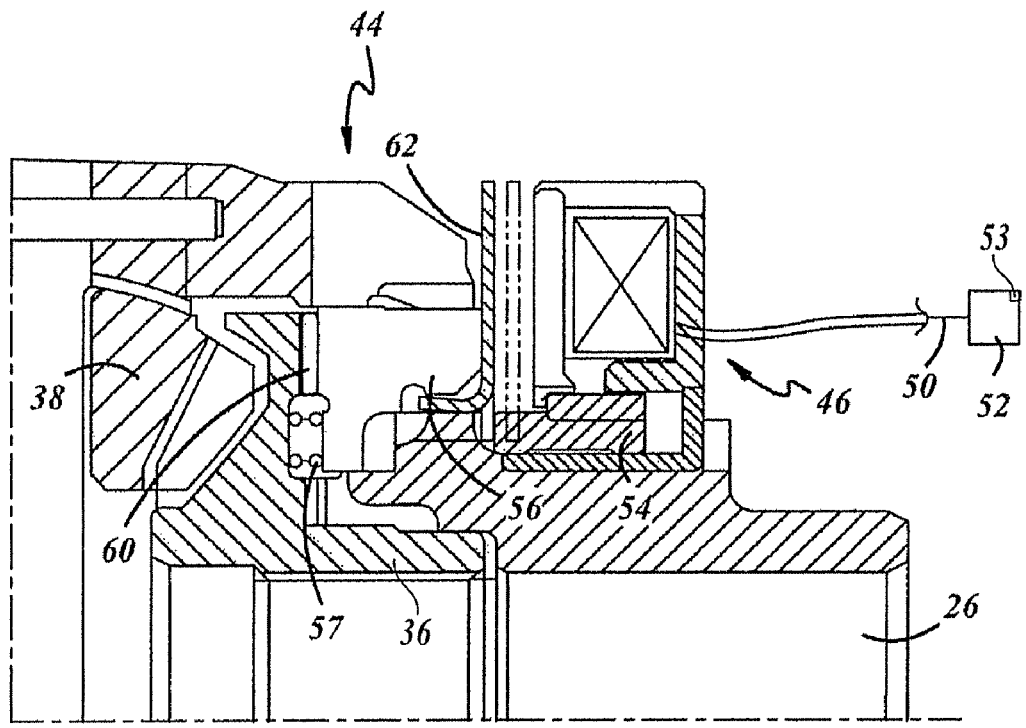
FIG. 3 is a cross-sectional illustration of the exemplary differential design illustrated in FIG. 1, the differential design illustrated in a locked position.

In the following description, various operating parameters and components are described for one or more exemplary embodiments. These specific parameters and components are included as examples and are not meant to be limiting.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

According to various exemplary illustrations, an electronic locking mechanism for a vehicle differential assembly includes a lock element movable in response to an actuation signal between an open position and a locked position. The lock element may be configured to permit side gears of the differential assembly to turn at varying rates relative to one another when the lock element is in the open position. The lock element also generally forces the side gears to turn generally at a same rate when the lock element is in the locked position. The electronic locking mechanism further includes a processor configured to determine a status of the differential assembly from a current profile that includes the actuation signal and an induced current. The determined differential assembly status is generally one of an "activated and locked" status, an "activated but unlocked" status, a "deactivated but locked" status, and a "deactivated and unlocked" status.

An exemplary method of determining a differential assembly status generally includes receiving an activation signal through a power wire at an electronic locking mechanism of the differential assembly. The electronic locking mechanism is configured to move in response to the activation signal between an open position, wherein the side gears are permitted to turn at varying rates with respect to each other, and a locked position, wherein the side gears are forced to turn at a same rate. The electronic locking mechanism is configured to selectively lock and unlock the differential assembly. The method further includes monitoring a current profile in the power wire and determining a status of the differential assembly from the current profile. The status includes one of an activated and locked position, an activated but unlocked position, a deactivated but locked position, and a deactivated and unlocked position.

Referring now to FIG. 1, a schematic of an exemplary differential assembly 10 is illustrated. A vehicle 12, represented schematically, is only for exemplary purposes and a host of permutations with respect to the configuration of vehicle 12 are possible in light of the present disclosure. The vehicle 12 includes a plurality of wheels 16 and joints 18. An engine 14 supplies torque to an input shaft 20 via a spool 22 or similar device. A first side shaft 24 and a second side shaft 26 extend into a differential case 28. The differential case 28 contains a differential mechanism 32 engaged with the side shafts 24, 26.

Referring now to FIG. 2, the first sideshaft 24 is connected to a first side gear 34 within the differential assembly 10. Similarly, the second side shaft 26 is connected to a second side gear 36 within the differential assembly 10. The differential mechanism 32 includes side gears 34, 36 that are generally housed within the differential case 28 and are mounted to the side shafts 24, 26, respectively. Further, pinion gears 38, 40 are meshed with gears 34, 36, respectively. The pinion gears 38, 40 are held within the differential case 28 by way of a pinion shaft 42. While the differential assembly 10 is illustrated in the Figures as a driven differential assembly that may be used for actively driving wheels of the vehicle, e.g., by transmitting power received from an input shaft, the locking mechanism described herein may also be employed with a non-driven axle.

The differential assembly 10 illustrated in FIG. 2 is shown in an open position (FIG. 2). In an open position, the side shafts 24, 26 may rotate at different speeds from one another while still being imparted drive from the differential case 28. However, certain driving conditions may make it desirable for the side shafts 24, 26 to rotate in unison such that torque is applied to the wheel for which it is most useful.

Accordingly, an electronic locking mechanism 46 is provided in communication with portions of the differential assembly 10 that includes a lock element for selectively locking and unlocking the differential assembly 10. The electronic locking mechanism 46 includes a solenoid 48 having a power wire 50 running to a processor 52. The processor 52 selectively accesses a memory 53 and/or other computer-readable medium that includes instructions executable by the processor for carrying out steps as described herein. For example, the processor 52 may access a vehicle control module configured to provide directives for other vehicle systems. The solenoid 48 may include a plunger element 54. The electronic locking mechanism 46 further includes a cam ring 56 having a cam ring face gear 58 configured to engage a corresponding lock face gear 60 formed on a back face of the second side gear 36. A pressure plate 62 mounted on a rear face of the cam ring 56 provides a convenient control surface for movement of the cam ring 56. A spring element 57 preferably biases the cam ring 56 into the open position, e.g., as shown in FIG. 2. For example, when a signal, e.g., an activation or actuation signal 64 (see FIG. 5), is sent from the processor 52 to the solenoid 48, plunger element 54 may be moved to push the pressure plate 62 and thereby the cam ring 56 towards a locked position, e.g., as shown in FIG. 3. In the locked position, shown in FIG. 3, the second side shaft 26 is locked to the differential case 28, which in turn forces the first side shaft 24 and the second side shaft 26 to rotate in unison. Accordingly, each of the plunger element 54, cam ring 56, and pressure plate 62 are illustrative examples of a lock element, as each generally moves in response to the actuation signal provided by the processor 52 to selectively lock and unlock the differential assembly 10.

Figure 4:
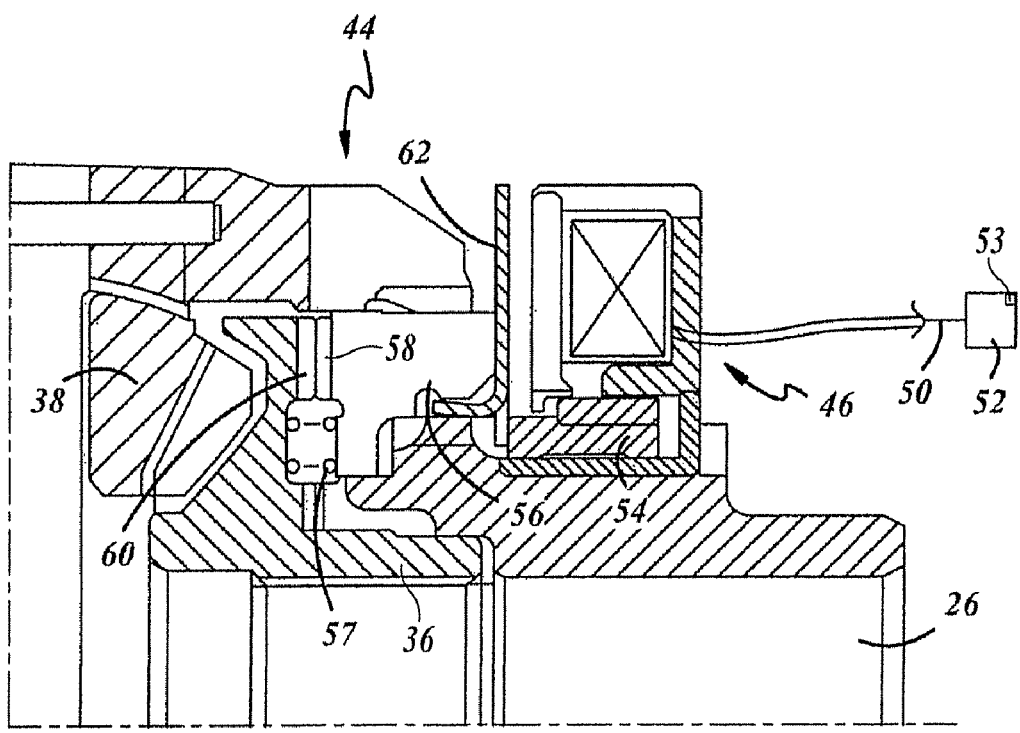
FIG. 4 is a cross-sectional illustration of the exemplary differential design illustrated in FIG. 1, the differential design illustrated in an activated but unlocked position.

Mere actuation of the electronic locking mechanism 46 may not guarantee that the cam ring face gear 58 properly engages the lock face gear 60. For example, the teeth of the two face gears 58, 60 may align and, at least temporarily, engagement (see FIG. 4) of the teeth may thereby be prevented. In other words, as shown in FIG. 4, each of the teeth of the face gears 58, 60 are positioned on top of one another, such that the teeth of the face gear 58 are not meshed with those of the face gear 60. By contrast, the teeth of the face gears 58, 60 are fully meshed in FIG. 3. In other words, the teeth of the face gears 58, 60 may at times be positioned such that activation of the locking mechanism 46 does not properly mesh the teeth of the face gears 58, 60 together, for example as shown in FIG. 4. Additionally, the teeth may skip or otherwise fail to engage even though the electronic locking mechanism 46 is activated.

Deactivation of the electronic locking mechanism 46 similarly does not guarantee the generally instant disengagement of the teeth of face gears 58, 60. In other words, when the activation signal is removed from the electronic locking mechanism 46 pressure on the teeth may prevent the face gears 58, 60 from immediately disengaging and the cam ring 56 from moving into the open position (FIG. 2), and thus the differential assembly 10 may remain in the locked position shown in FIG. 3 for a short period of time.

Accordingly, exemplary embodiments provide for sensing changes in between the actual states of the differential assembly 10, and for the processor 52 to be able to determine the actual status of the differential assembly 10, i.e. in an open position (FIG. 2), the locked position (FIG. 3), an activated but unlocked position (FIG. 4), or in a deactivated but locked position where the face gears 58, 60 remain in engagement despite the deactivation of the electronic locking element 46. Advantageously, processor 52 determines changes in differential assembly 10 without an independent position sensor and the associated wiring and cost thereof. To this end, processor 52 may execute instructions configured to monitor a current profile 70 (see FIG. 5) to determine an actual status of the differential assembly 10.

Figure 5:
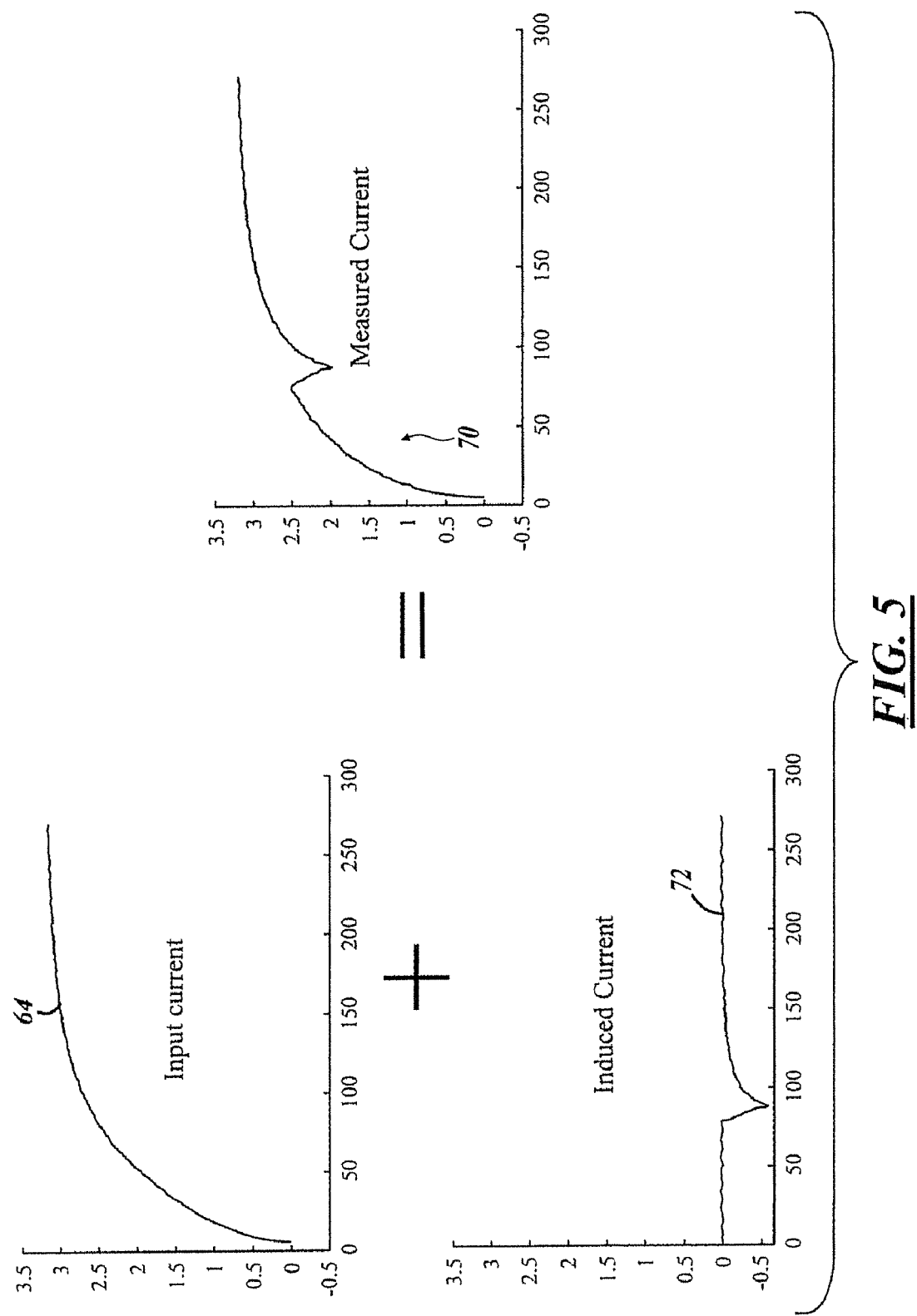
FIG. 5 is an illustration of current superposition resulting in a current profile realized in a power wire associated with a locking element of a differential.

The current profile 70 is generally subject to both Faraday's law and Lenz's law. Faraday's law dictates that the movement of a magnet through a coil generates current. Lenz's law dictates the direction of movement of magnetic flux through a coil determines the direction in which the current is generated. As illustrated in FIG. 5, the current profile 70 is comprised of the activation signal 64 applied or removed from the solenoid 48 and/or electronic locking mechanism 46, in addition to the induced current 72 generated by movement of the solenoid 48 and/or electronic locking mechanism 46 in accordance with Faraday's and Lenz's laws. Thus, the addition of the activation signal 64 and induced current 72 may be a natural superposition of the activation signal 64 upon the induced current 72, resulting in a current profile 70 as illustrated in FIG. 5. The current profile 70 can be analyzed according to instructions executed by the processor 52 in real-time or near-real time to monitor and determine a position of the electronic locking mechanism 46 and/or the pressure plate 62, and thus the actual status of the differential assembly 10.

FIG. 6 is an illustration of a current profile 70 generated by the transition of differential assembly 10 from the open position (FIG. 2) to the locked position (FIG. 3). As shown in FIG. 6, the current profile 70 includes a generally smooth curve representing application of the actuation signal 64. The current profile 70, however, contains a first deviation 74 generated by the movement of the electronic locking mechanism 46 and/or plunger element 54 into the locked position (FIG. 3). The first deviation 74 includes a first deviation depth 76. The first deviation depth 76 (actuated and locked, referred to as "A&L" hereinafter) is representative of the nature of the travel of the electronic locking mechanism 46 when relatively quickly, e.g., instantly or nearly instantly achieving the locked position (FIG. 3). For example, when the electronic locking mechanism 46 travels from the unlocked position to the locked position (FIG. 3) without any interference from the teeth of gears 58, 60 that would otherwise inhibit the travel of the locking element 46, the deviation depth will be greater than if the teeth of gears 58, 60 align and prevent the locking element 46 from traveling to the locked position generally immediately.

Therefore, the first deviation depth 76 may be analyzed according to instructions executed by the processor 52 to determine if the locked position (FIG. 3) was actually achieved. If the first deviation depth 76 has a smaller value than that associated with fully achieving the locked position (FIG. 3) instantly or nearly instantly, the processor 52 determines that the differential assembly 10 is in the activated but unlocked position (e.g., FIG. 4), as represented in FIG. 7 by first deviation depth $76_{A\&U}$. When a reduced first deviation depth $76_{A\&U}$, e.g., a depth that is smaller in magnitude than that associated with the locking element fully traveling immediately to the locked position, e.g., the first deviation depth 76, is detected, the logic then continues to monitor the current profile 70 for a second deviation 77 having a second deviation depth 78 indicative of the electronic locking mechanism 46 achieving the locked position (FIG. 3) at a delayed time (see FIG. 7). In this fashion, the logic can easily determine if the differential assembly 10 is in an activated and locked status or an activated and unlocked status. Reliably determining the locked position (FIG. 3) can be useful for a wide variety of automotive applications.

FIG. 8 is an illustration of a current profile 70 generated by the transition from the locked position (FIG. 3) to the open position (FIG. 2). As can be seen, the current profile 70 of differential assembly 10 illustrated in FIG. 8 includes a precipitous drop represented by the removal of the actuation signal 64. The current profile 70, however, contains a relatively quick first spike 80 generated by the movement of the electronic locking mechanism 46 into the open position (FIG. 2). The quick first spike 80 has a quick spike magnitude 82. If, however, the face gears 58, 60 remain locked even after removal of the actuation signal 64 then there will be no quick first spike 80. The quick first spike is generally present in a primary transition of the current profile 70, i.e., a portion of the current profile 70 representing deactivation of the electronic locking mechanism 46 and its corresponding movement out of the locked position. For example, a primary transition of a current profile may include an initial downslope resulting when the signal or current is "removed," and the current or activation signal generally decays to a constant, e.g., zero. Typically, a primary downslope may occur within a particular time period after removal of the actuation signal 64, or after the current level reaches a particular level indicative of the removal of the actuation signal 64. In one known example, processor 52 determines that the quick first spike is not present if it does not occur before the current profile 70 decays below approximately 0.005 Amperes. The processor 52 may execute instructions such that the processor 52 continues to monitor the current profile 70 until a delayed first spike 84, for example as illustrated in FIG. 9, is registered with a delayed spike depth 86 indicative of a transition to the open position (e.g., as shown in FIG. 2). In this fashion, the actual state, as well as the desired state of the differential assembly 10, can be relatively accurately determined. For example, such determinations can be made without the cost and complexity of independent sensor assemblies. In addition, although the superposition current may be adequate for proper determination of differential state change, it is contemplated that the present system may be utilized in combination with other status verifying methodologies, e.g., wheel speed sensing systems or independent transducer systems.

Figure 10A:
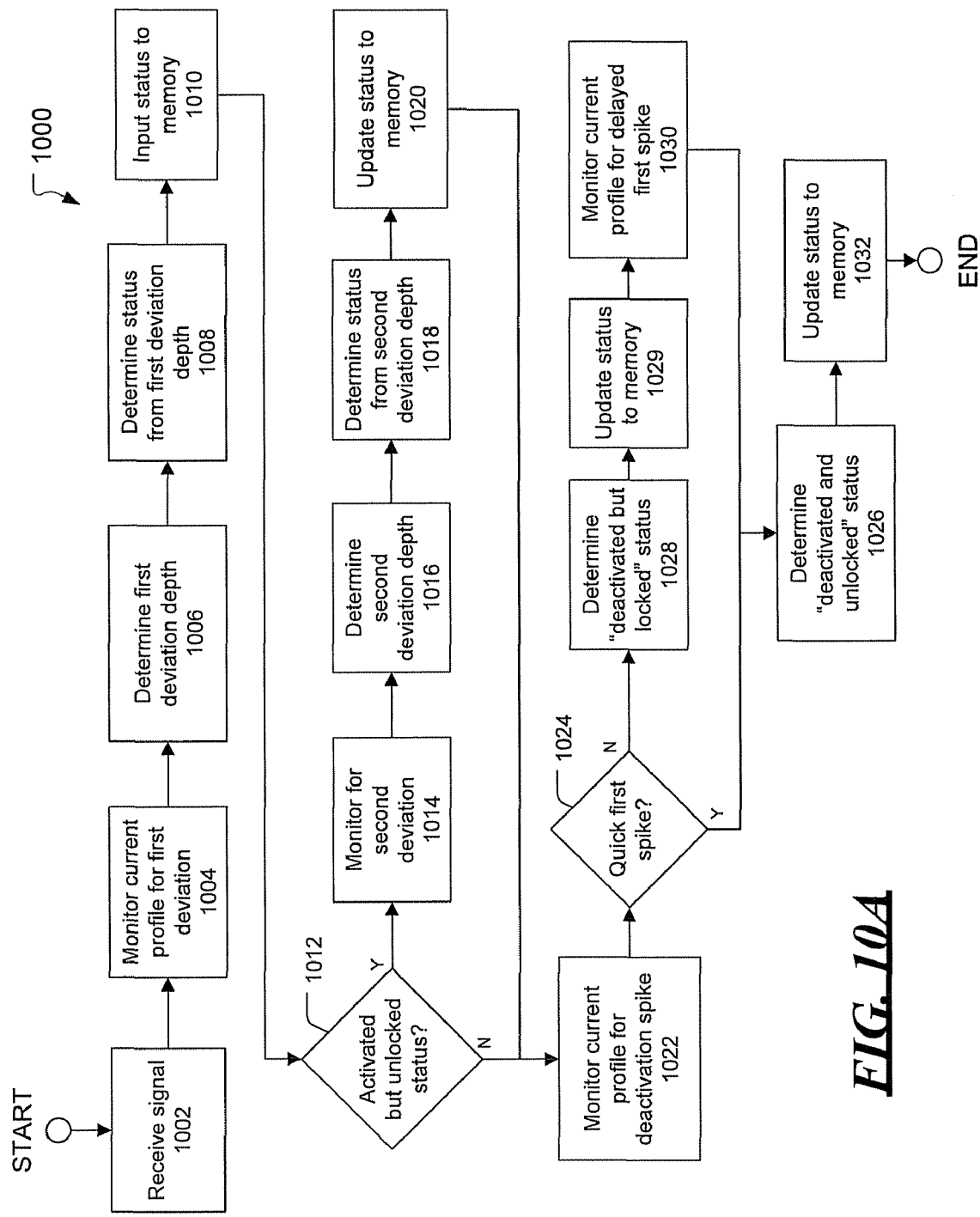
FIG. 10A is a schematic diagram of an exemplary process for determining a status of a differential assembly.

Turning now to FIG. 10, an exemplary process 1000 for actuating an electronic locking mechanism is illustrated. Process 1000 begins at step 1002, where a signal is received. For example, as described above, a processor 52 may receive an actuation signal that activates an electronic locking mechanism 46 when a locked status of the differential assembly 10 is desired. Process 1000 then proceeds to step 1004.

In step 1004, a current profile associated with the activation signal is monitored for a first deviation. For example, as described above, the processor 52 may monitor current profile 70 for the existence of a first deviation 74. Process 1000 then proceeds to step 1006.

In step 1006, a depth associated with the first deviation 74 is determined by the processor 52. Proceeding to step 1008, processor 52 determines a status of differential assembly 10 from the first deviation depth 76. For example, where the first deviation depth 76 is indicative of the electronic locking mechanism 46 engaging in a locked position generally immediately as described above, the processor 52 may determine that the differential assembly 10 is in the activated and locked status. However, where the first deviation depth 76 is indicative of an incomplete engagement of the electronic locking mechanism 46, the processor 52 may determine that the differential assembly 10 is in the activated but unlocked status. As described above, a greater magnitude of the first deviation depth 76 will generally tend to indicate a quicker or otherwise more immediate engagement of the electronic locking mechanism 46.

Figure 10B:
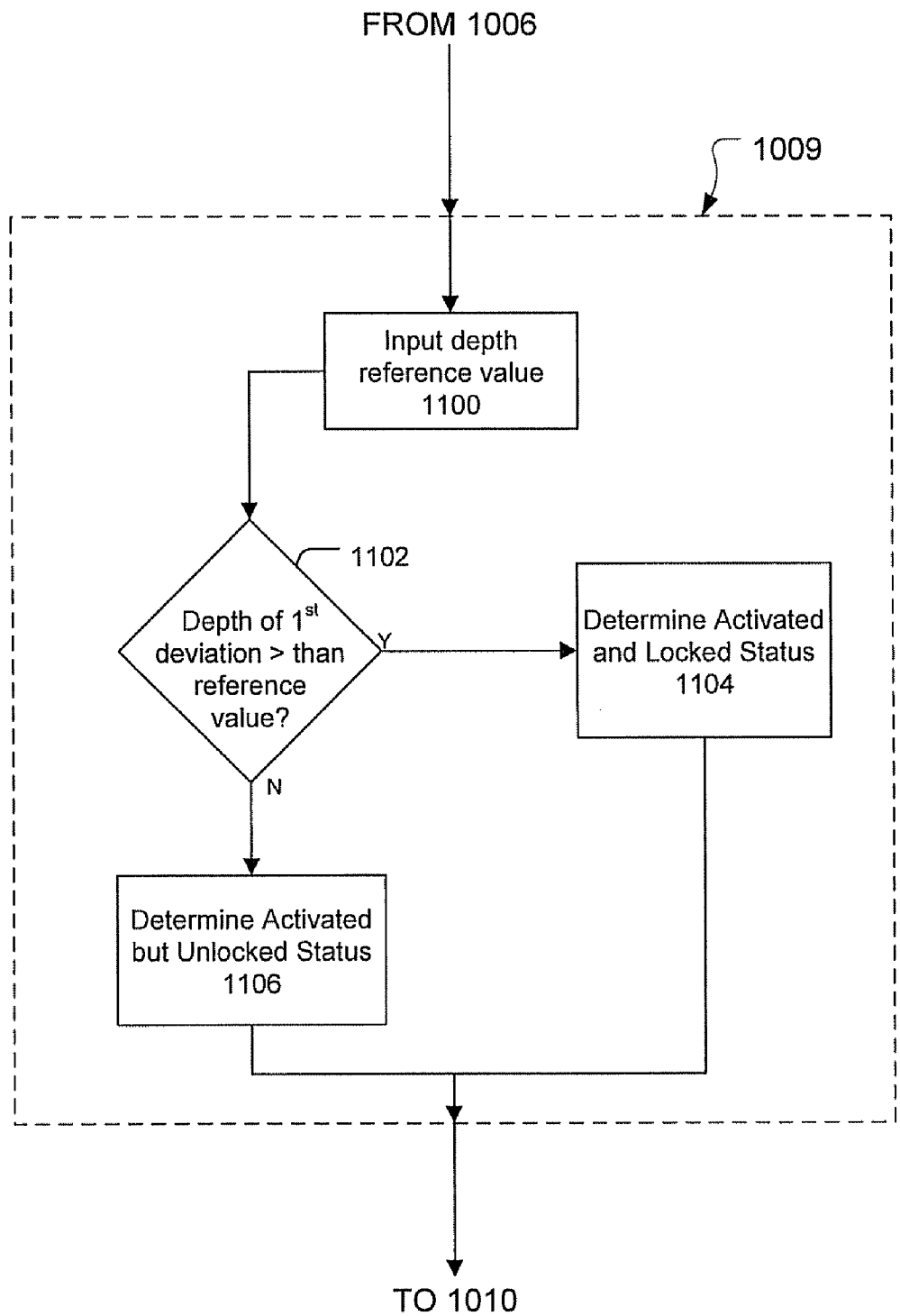
FIG. 10B is a schematic diagram of an exemplary step in the process shown in FIG. 10A.

Turning now to FIG. 10B, step 1008 is illustrated in further detail as subprocess 1009, according to one exemplary approach. Subprocess 1009 initially proceeds to step 1100, where a depth reference value is input to processor 52. The depth reference value may generally be equivalent to a minimum value of the first deviation depth 76 that indicates generally immediate locking of the electronic locking mechanism 46. The depth reference value will generally depend upon the particular design and construction of the electronic locking element 46 and the differential assembly 10, and how the locking element 46 and/or other components of the differential assembly 10 affect the current profile 70 according to Faraday and Lenz's Laws, as described above. Merely as examples, the size or weight of the plunger element, maximum current in the power wire, and/or the size or weight of other elements in communication with the plunger elements (for example, components of the differential assembly 10), will affect the depth reference value for a given differential assembly.

Proceeding to step 1102, the depth of the first deviation may be compared to the reference value to determine the status of the differential assembly 10. In other words, if the depth of the first deviation is greater than or equal to the reference value, subprocess 1009 proceeds to step 1104 where the processor determines that the differential assembly 10 is in the activated and locked status. However, if the depth of the first deviation is less than the reference value, then the processor 52 may determine that the differential assembly 10 is in the activated but unlocked status in step 1106. The subprocess 1009 then proceeds to step 1010.

Turning back to FIG. 10A, the differential assembly status may be input to a memory in step 1010. For example, processor 52 may be associated with memory 53 that stores at least the most recently determined differential assembly status. The stored differential assembly status may then be selectively retrieved by processor 52 or any other vehicle system or processor in communication with the memory, as may be convenient. For example, vehicle stability control systems, vehicle traction control systems, or anti-lock braking systems may selectively retrieve this information from the memory as may be convenient. Process 1000 then proceeds to step 1012.

In step 1012, processor 52 determines whether the activated but unlocked status was determined in step 1008. If the differential assembly 10 was determined to have an activated but unlocked status, process 1000 then proceeds to step 1014. However, if the activated but unlocked status was not determined in step 1008 (meaning that the differential assembly 10 is in the activated and locked status), then process 1000 proceeds directly to step 1022, below. In step 1014, processor 52 monitors the current profile 70 for the existence of a second deviation 77.

Proceeding to step 1016, processor 52 determines a depth of the second deviation 77.

Proceeding to step 1018, processor 52 determines a status of differential assembly 10 from the second deviation depth 78. For example, once the second deviation is detected, the processor 52 will generally determine that the differential assembly 10 is in the activated and locked status.

Process 1000 then proceeds to step 1020, where processor 52 updates the status to the memory.

Proceeding to step 1022, processor 52 monitors the current profile 70 for a deactivation spike. For example, as described above, a relatively quick first spike 80 or a delayed first spike 84 may exist when the current profile 70 is deactivated.

Process 1000 then proceeds to step 1024. In step 1024, processor 52 determines whether a quick first spike 80 is present in the signal. If the quick first spike 80 is present, process 1000 proceeds to step 1026 where the processor 52 determines that the differential assembly 10 is in a deactivated and unlocked status. In other words, where a first spike is present in the signal, i.e., the current profile 70, the processor 52 will generally determine that the face gears 58, 60 generally immediately disengage, and thus the differential assembly 10 is in the deactivated and unlocked status. If, however, the processor 52 determines that the quick first spike 80 is not present, process 1000 proceeds to step 1028.

In step 1028, the processor 52 determines that the differential assembly 10 is in the deactivated but locked status. In other words, if the quick first spike 80 is not present in the current profile 70, the processor 52 generally will determine that the electronic locking mechanism 46 and/or the face gears 58, 60 are not completely disengaged. Process 1000 then proceeds to step 1029.

In step 1029, the status of the differential assembly 10 is updated to the memory. For example, as described above, a memory may be provided as part of or in communication with processor 52.

Proceeding to step 1030, the processor 52 monitors the current profile 70 for a delayed first spike 84. Generally, as described above, the delayed first spike 84 will be present when the quick first spike 80 is not present in the current profile 70. The processor 52 thus continues to monitor the current profile 70 until the delayed first spike is detected. Once the delayed first spike is detected by processor 52, process 1000 may proceed to step 1026, where a deactivated and unlocked status of differential assembly 10 is determined by the processor 52. Proceeding to step 1032, the differential assembly status is updated to the memory. Process 1000 then terminates.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An electronic locking mechanism for a vehicle differential assembly, the electronic locking mechanism comprising:
   a lock element movable in response to an actuation signal between an open position and a locked position, said lock element configured to permit a first side gear and a second side gear to turn at varying rates relative to one another when said lock element is in said open position, said lock element further configured to force the side gears to turn generally at a same rate when said lock element is in said locked position; and
   a processor configured to determine a status of the differential assembly from a current profile, said current profile including the actuation signal and an induced current;
   wherein said determined differential assembly status includes one of an activated and locked status, an activated but unlocked status, a deactivated but locked status, and a deactivated and unlocked status.

2. The electronic locking mechanism of claim 1, said processor further configured such that said activated and locked status is determined when said lock element is in said locked position and the differential assembly is locked;
   said activated but unlocked position is determined when said lock element is actuated to be in said locked position and the differential assembly is unlocked;
   said deactivated but locked position is determined when said lock element is actuated to be in said unlocked position and the differential assembly is locked; and
   said deactivated and unlocked position is determined when said lock element is actuated to be in said unlocked position and the differential assembly is unlocked.

3. The electronic locking mechanism of claim 1, further comprising:
   a solenoid in communication with the actuation signal; and
   a plunger element actuated by the solenoid;
   wherein said plunger element generates said induced current.

4. The electronic locking mechanism of claim 1, wherein said induced current is generated by movement of said lock element.

5. The electronic locking mechanism of claim 1, wherein said processor is further configured to monitor said current profile for a first deviation, determine a first deviation depth of said first deviation, and assign said differential assembly status based on said first deviation depth.

6. The electronic locking mechanism of claim 1, wherein said processor is further configured to continue to monitor said current profile for a second deviation if said first deviation depth indicates an activated but unlocked status, wherein said activated but unlocked status is associated with said lock element being positioned between said open position and said locked position.

7. The electronic locking mechanism of claim 1, wherein said processor is further configured to monitor said current profile for a quick first spike, said quick first spike occurring in a primary transition of said current profile associated with said lock element moving out of said locked position, monitor said current profile for a delayed first spike if said quick first spike is absent, and determine said differential assembly status based on the presence of one of said quick spike and said delayed first spike.

8. A differential assembly for a vehicle comprising:
a first side gear secured to a first side shaft for rotation therewith;
a second side gear secured to a second side shaft for rotation therewith;
a differential case generally housing said first side gear and said second side gear;
an electronic locking mechanism movable between an open position and a locked position in response to an actuation signal from a power wire, said locking mechanism configured to permit said side gears to turn at varying rates relative to one another when said locking mechanism is in said open position, said locking mechanism further configured to force the side gears to turn at a generally same rate when said locking mechanism is in said locked position; and
a processor configured to determine a status of the differential assembly from a current profile, said current profile including the actuation signal and an induced current;
wherein said determined differential assembly status includes one of an activated and locked status, an activated but unlocked status, a deactivated but locked status, and a deactivated and unlocked status.

9. The differential assembly of claim 8, said processor further configured such that said activated and locked status is determined when said locking mechanism is in said locked position and the differential assembly is locked;
said activated but unlocked position is determined when said electronic locking mechanism is actuated to be in said locked position and the differential assembly is unlocked;
said deactivated but locked position is determined when said electronic locking mechanism is actuated to be in said unlocked position and the differential assembly is locked; and
said deactivated and unlocked position is determined when said electronic locking mechanism is in said unlocked position and the differential assembly is unlocked.

10. The differential assembly of claim 8, further comprising:
a solenoid in communication with the actuation signal; and
a plunger element actuated by the solenoid;
wherein said plunger element generates said induced current.

11. The differential assembly of claim 9, further comprising a cam ring in communication with said plunger element, said solenoid element selectively moving said cam ring with said plunger element into said locked position wherein a cam face gear on said cam ring engages a lock face gear on said second side gear.

12. The differential assembly of claim 11, further comprising a pressure plate mounted to said cam ring, wherein said processor is configured to generally monitor movement of said pressure plate.

13. The differential assembly of claim 8, wherein said current profile is generated by superpositioning said induced current onto said actuation signal in the power wire, said induced current associated with movement of said electronic locking mechanism.

14. The differential assembly of claim 8, wherein said processor is further configured to monitor said current profile for a first deviation, determine a first deviation depth of said first deviation, and assign said differential assembly status based on said first deviation depth, continue to monitor said current profile for a second deviation if said first deviation depth indicates an activated but unlocked status, wherein said activated but unlocked status is associated with said electronic locking mechanism being positioned between said open position and said locked position.

15. The differential assembly of claim 8, wherein said processor is further adapted to monitor said current profile for a quick first spike, said quick first spike occurring in a primary downslope of said current profile associated with said electronic locking mechanism moving out of said locked position, monitor said current profile for a delayed first spike if said quick first spike is absent, and determine said differential assembly status based on the presence of one of said quick spike and said delayed first spike.

16. A method, comprising:
receiving an activation signal through a power wire at an electronic locking mechanism of a differential assembly, the differential assembly including two side shafts, each of the side shafts having associated side gears, the differential assembly further including a differential case generally housing the first and second side gears, said electronic locking mechanism moving in response to said activation signal between an open position, wherein the side gears are permitted to turn at varying rates with respect to each other, and a locked position, wherein the side gears are forced to turn at a same rate, said electronic locking mechanism configured to selectively lock and unlock the differential assembly;
monitoring a current profile in said power wire; and
determining a status of said differential from said current profile, said status including one of an activated and locked position, an activated but unlocked position, a deactivated but locked position, and a deactivated and unlocked position.

17. The method of claim 16, further comprising:
determining said activated and locked status when said electronic locking mechanism is in said locked position and the differential assembly is locked;
determining said activated but unlocked status when said electronic locking mechanism is in said locked position and the differential assembly is unlocked;
determining said deactivated but locked status when said electronic locking mechanism is in said unlocked position and the differential assembly is locked; and determining said deactivated and unlocked status when said electronic locking mechanism is in said unlocked position and the differential assembly is unlocked.

18. The method of claim 16, further comprising:
monitoring said current profile for a first deviation;
determining a first deviation depth of said first deviation; and
determining said status of the differential assembly based at least upon said first deviation depth.

19. The method of claim 18, further comprising:
determining an activated but unlocked status of said differential assembly from said first deviation depth;
continuing to monitor said current profile for a second deviation; and
determining said differential assembly status based upon at least said second deviation.

20. The method of claim 19, further comprising:
determining a second deviation depth of said second deviation; and
determining said differential assembly status based on said second deviation depth.

21. The method of claim 16, further comprising:
monitoring said current profile for a quick first spike, said quick first spike occurring during a primary transition of said current profile;
monitoring said current profile for a delayed first spike if said quick first spike is absent; and
determining said differential assembly status based on the presence of one of said quick first spike and said delayed first spike.

* * * * *